Patented Sept. 21, 1948

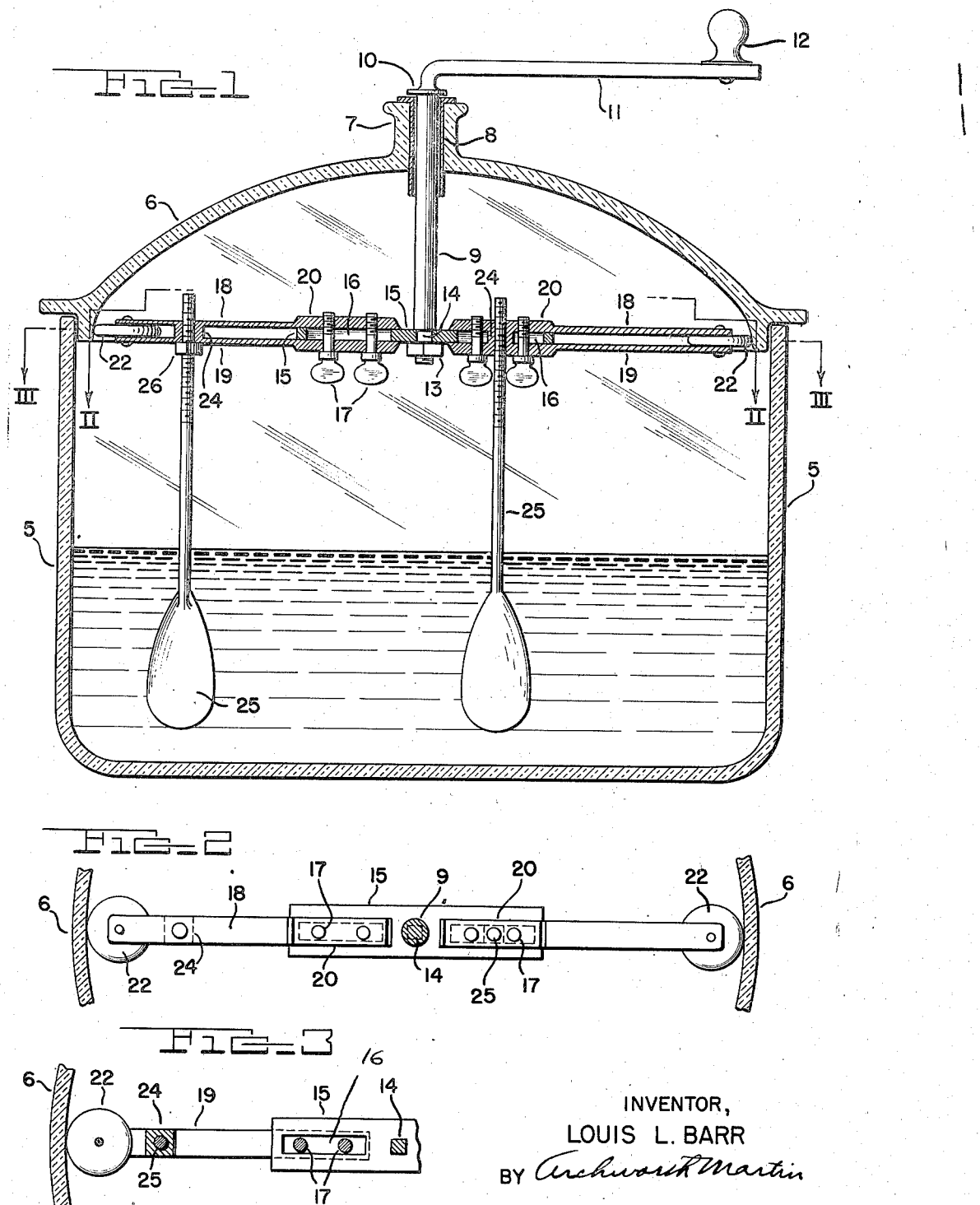

2,449,578

UNITED STATES PATENT OFFICE 2,449,578

STIRRER FOR COOKING VESSELS

Louis L. Barr, Pittsburgh, Pa.

Application February 27, 1947, Serial No. 731,371

1 Claim. (Cl. 259—122)

One object of my invention is to provide stirring mechanism that can conveniently be operated from the exterior of a cooking vessel, while maintaining a lid in position on the vessel, so that it is unnecessary for the housewife to lift the lid, with consequent danger of annoyance from escaping steam, in order to stir the contents of the vessel.

Another object of my invention is to provide a stirring device that can readily be connected to pot lids of various diameters and used effectively with cooking vessels of various depths.

In the accompanying drawing, Figure 1 is a vertical sectional view through a pot lid having my invention applied thereto, the lid being positioned upon a pot or cooking vessel; Fig. 2 is a view taken on the line II—II of Fig. 1, and Fig. 3 is a view of a portion of the apparatus of Fig. 2, taken on the line III—III of Fig. 1.

The invention comprises stirring apparatus that can be applied to cooking pot lids of somewhat conventional form except that they must have a vertical hole drilled through the center in order to receive a shaft. A cooking pot is indicated by the numeral 5 and has a lid 6 which may conveniently be of glass. A hole is formed through the usual knob 7 of the lid to receive a bearing bushing 8 through which a shaft 9 extends, the shaft being provided with a rib or flange 10 that rests upon the sleeve 8. The upper end of the shaft has a crank 11 for a handle 12 by which the shaft will be turned.

At its lower end, the shaft is of reduced diameter and threaded to receive a nut 13. The shaft extends through a rectangular hole 14 in a supporting plate 15, that portion of the shaft that lies within this hole being of rectangular form in cross section to hold the shaft and the plate against relative rotation.

The plate 15 has slots 16 to receive adjusting screws 17 that, together with their bracket plates 18 and 19, are slidable longitudinally of these slots when the screws are loosened. The bracket plates 18 are thickened at 20 and have tapped holes for the upper threaded ends of the screws, so that when the screws 17 are tightened, they will clamp the inner ends of their respective bracket plates 18—19 tightly against the plate 15.

At their outer ends, each pair of arms 18—19 has a roller 22 journaled therein for engagement with the inner wall of the lid 6 near its lower edge. These rollers support the lower end of the shaft against tilting movements when the crank 11 and the shaft are being turned.

The arms 18—19 have threaded bushings 23 and 24 welded thereto to receive the threaded stems of stirrers 25 which may be threaded for a considerable length in order to provide for vertical adjustments of the stirrers.

Jam nuts such as the nut 26 may be employed to hold the stirrers against idle turning, but usually they will not be required, because if the stirrers are somewhat spoon-shaped, they will be held in flatwise positions during stirring movements, simply through the drag of the contents of the pot thereon.

It will be seen that when the parts are assembled as shown in Fig. 1 with the brackets 18—19 adjusted radially to a position at which their rollers 22 will engage the wall of the lid, and with the desired number of stirrers 25 in place, rotation of the shaft 9 will effect mixing of the contents of the vessel. If occasion should arise to remove the stirring apparatus from the lid 6, such removal can be effected simply by taking off the nut 13, to disconnect the stirring mechanism and to allow the shaft to be lifted through the knob 7.

I claim as my invention:

A stirring device comprising a lid adapted to rest upon the upper edge of a pot and having a depending circular flange at its lower edge, of materially less diameter than the smaller diameter of the pot-engaging area of the lid, a vertical shaft extending centrally through the lid, to approximately the lowermost plane thereof, a bracket non-rotatably secured to the lower end of the shaft, stirring devices carried by said bracket and depending therefrom into position to stir the contents of a pot on which the lid is placed, and anti-friction rollers carried by said bracket, on vertical axes, in position to engage the inner annular surface of the said flange and support the shaft against lateral movement.

LOUIS L. BARR.

REFERENCES CITED

The following references are of record in the file of this patent:

UNITED STATES PATENTS

| Number | Name | Date |
|---|---|---|
| 1,218,623 | Brillhart | Mar. 13, 1917 |
| 1,471,629 | Parry | Oct. 29, 1923 |
| 1,761,613 | Chrul | June 3, 1930 |
| 2,194,688 | Bremer | Mar. 26, 1940 |

FOREIGN PATENTS

| Number | Country | Date |
|---|---|---|
| 172,473 | Germany | Aug. 11, 1905 |